UNITED STATES PATENT OFFICE.

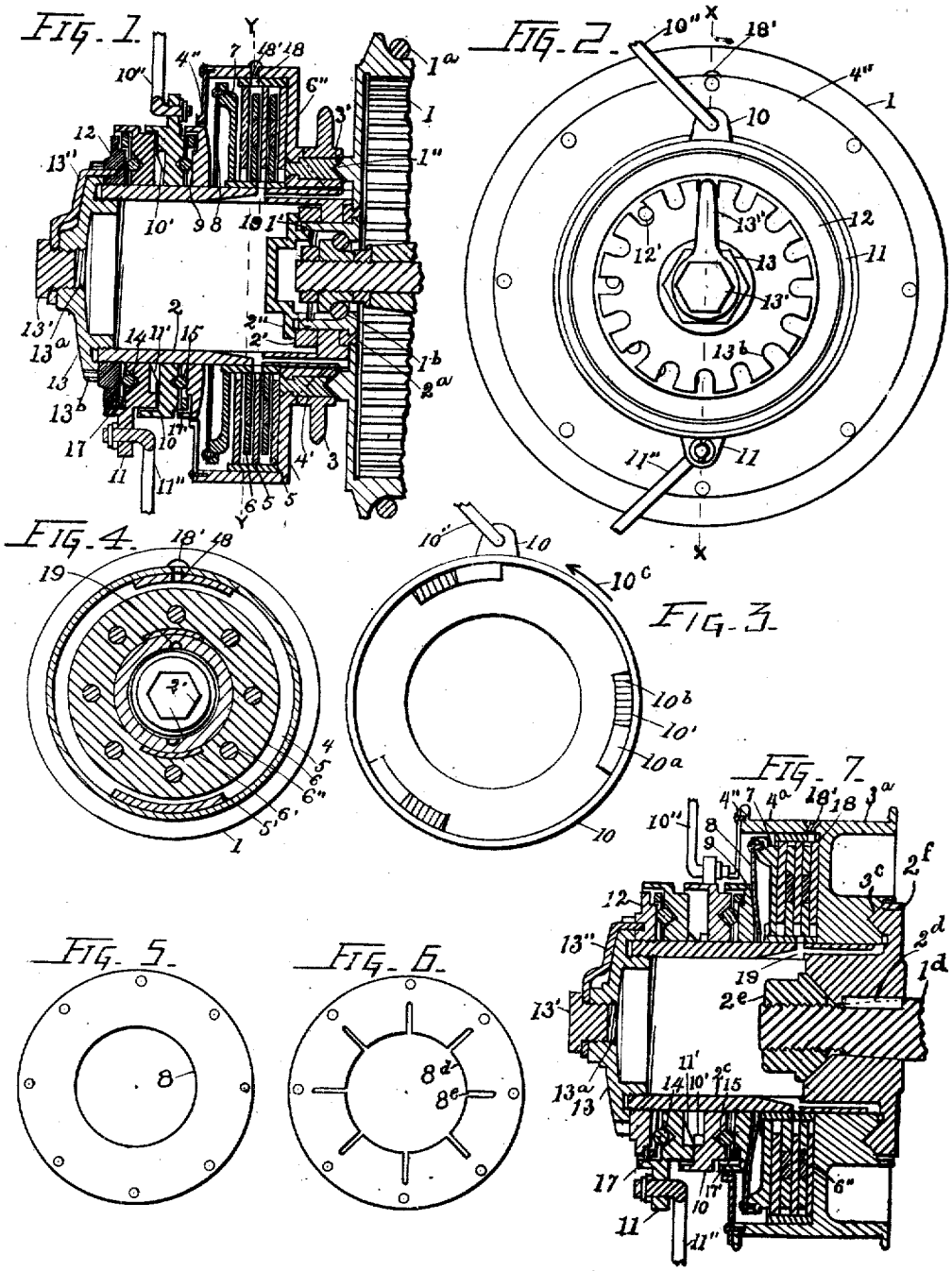

JAMES B. HERNDON, OF ST. JOSEPH, MISSOURI.

CLUTCH.

1,010,366.

Specification of Letters Patent.

Patented Nov. 28, 1911.

Application filed April 13, 1911. Serial No. 620,898.

*To all whom it may concern:*

Be it known that I, JAMES B. HERNDON, a citizen of the United States, residing at St. Joseph, in the county of Buchanan and State of Missouri, have invented certain new and useful Improvements in Clutches, of which the following is a specification, reference being had therein to the accompanying drawing.

My invention relates to improvements in friction clutches of the multiple disk type and the objects of my improvements are; first: to provide a clutch of this class which shall be adapted for general use and be particularly applicable to motor cycles now generally in service and which will not cause sudden strain on the parts involved when said clutch is applied for starting a motor cycle or other mechanism; second; to so construct and arrange the parts of a multiple disk clutch that the same shall occupy the minimum amount of space, be neat in appearance, simple in construction, compact, substantial and durable; third: to provide automatic lubricating means, whereby the parts of said clutch are thoroughly lubricated, and whereby the same may be thoroughly flushed with a cleansing liquid; fourth: to so construct a clutch of this class that the same shall be operated with the minimum amount of manual force, be practically dust proof throughout and be provided with locking means whereby the parts of said clutch shall be securely locked on the clutch shaft. I attain these objects by the mechanism illustrated in the accompanying drawing, in which:—

Figure 1 is a longitudinal section on the line X X seen in Fig. 2, looking toward the left and showing the parts of the clutch in disengaged position. Fig. 2 is an end view of the parts seen in Fig. 1, looking toward the right. Fig. 3 is a face view in detail of the rotatable moving plate. Fig. 4 is a reduced transverse section on the line Y Y, seen in Fig. 1, looking toward the right. Fig. 5 is a reduced face view of the spring tension disk. Fig. 6 is a view similar to Fig. 5, of one of the other various forms in which the spring tension disk may be made. Fig. 7 is a section similar to Fig. 1, showing one of the other various forms in which the power transmitting means and the clutch shaft securing means may be made the parts of the clutch being in disengaged position.

Referring to Fig. 1, the ordinary internal gear 1 is rotatably mounted between bearings $1^a$ and $1^b$ which are supported by certain fixed parts of a motor cycle. Said gear 1 is rotated by an engine, and since said engine and said fixed parts form no part of my invention, the same are neither shown nor described. Said gear is provided with hub 1' and with the V shaped friction face 1" formed therewith.

Hollow clutch shaft 2 is secured on hub 1' by the right threaded nut 2' screwed on the outer end of said hub; said nut being secured thereon by the left threaded cap nut 2" screwed in the outer end of hub 1'. Said clutch shaft is rotated by studs $2^a$ secured in gear 1 and extending therefrom into the end of said clutch shaft.

Driving means 3 may be either a sprocket wheel 3 as seen in Fig. 1, or the same may be a belt drive pulley $3^a$, seen in Fig. 7. Said sprocket wheel 3 is provided with friction face 3' adapted to frictionally engage face 1" and is preferably secured to clutch drum 4 by studs 4', though said sprocket wheel may be formed integral with said drum where such is desired. Said drum and wheel are rotatably mounted on shaft 2. Said drum carries the drum friction disks 5, slidably splined therein by the diametrically opposite keys 5' secured on the inner surface of said drum. Said disks are driven by frictional contact of drive disks 6, slidably splined on shaft 2 by keys 6' secured on said shaft. Said drive disks have hard wood insertions 6" secured therein, for increasing friction thereof, as seen in Figs. 1 and 4. Spring carrying disk 7 is also slidably splined on shaft 2 by said key 6' and carries the spring tempered tension disk 8, secured thereto at the outer edges of said disk. The inner edge portion of disk 8 is free and yieldable. Said yieldable portion of disk 8 is pressed by thrust collar 9 slidably moved on shaft 2 against said tension disk by the rotatable thrust plate 10, rotatably mounted and slidable on shaft 2. Said plate is provided with wedge blocks 10' formed thereon, said wedge blocks each having a flat face $10^a$ and an inclined face $10^b$ as seen in Fig. 3. Said plate is also provided with manual operating rod 10", pivotally secured thereto for manually rotating said plate on shaft 2.

Fixed plate 11 is loosely mounted on shaft 2, and is provided with fixed wedge blocks 11' formed thereon, which are of the same shape as the previously described wedge blocks 10', for causing said slidable movement of plate 10 when the inclined faces of its wedge blocks are rotated past the inclined faces of fixed wedge blocks 11'. Plate 11 is also provided with holding rod 11'', the outer end of which is secured to any desirable fixed part of said motor cycle, for holding plate 11 against rotation with shaft 2, said fixed part and outer end not being shown.

Outer thrust bearing piece 12 is screwed on the outer right threaded end of shaft 2, for adjusting the space between thrust collar 9 and tension disk 8 and between disks 5 and 6. Said bearing piece 12 has key apertures 12' formed therein as seen in Fig. 2. Said piece is secured in said adjustment by cap nut 13 screwed in the internally left threaded outer end of shaft 2.

Cap nut 13 has oil opening 13ᵃ formed through the center thereof and has key notches 13ᵇ formed in its periphery. Shaft 2 is filled with oil passed therein through said oil opening, said oil not being shown.

Oil plug 13' is passed through the inner end of cap key 13'' and is screwed in oil opening 13ᵃ for closing said opening and for securing said key on said cap nut, while the outer end of said key is passed through one of the notches 13ᵇ and into an aperture 12' for securely locking cap nut 13 and bearing piece 12 in position on shaft 2.

Anti-friction bearing 14 between plate 11 and thrust bearing piece 12 and anti-friction bearing 15 between plate 10 and thrust collar 9 prevent friction between the parts mentioned. Felt washers 17 and 17' respectively protect said bearings from dust.

Oil outlet aperture 18 is formed through drum 4 and is closed by screw 18' screwed therein. Shaft 2 has oil ducts 19 formed through the wall thereof adapted to conduct oil from the interior of said shaft onto friction faces 1'' and 3', and into drum 4, from whence said oil finds access to the other described parts and throughout the interior of said drum by reason of the hereinafter described movement of said parts. The open end of drum 4 is closed by cover 4''.

In installation, the described clutch, carrying sprocket wheel 3, is secured on the ordinary internal gear 1, of a motor cycle. The slidable movement of the described clutch disks is adjusted to the practicable minimum, by adjusting thrust bearing piece 12 on shaft 2, cap nut 13 is screwed solidly against piece 12, oil plug 13' is removed from oil opening 13ᵃ and any suitable heavy or hard oil, (not shown,) is forced through said oil opening until shaft 2 is thereby filled. Lock key 13'' is put in place as seen in Fig. 2, for locking the previously described adjustment, and plug 13' is screwed into place, as seen.

In operation, with the parts in disengaged position, as seen in Fig. 1, the engine, not shown, rotates gear 1, together with its hub 1', clutch shaft 2, drive disks 6 and spring carrying disk 7, carrying tension disk 8 and also rotates thrust collar 9, bearings 15 and 14, bearing piece 12, cap nut 13 and the thereto attached parts, while the unmentioned parts stand idle, with sprocket wheel 3, free from gear 1 and from said engine.

When it is desired to engage said sprocket wheel with gear 1, rod 10'' is manually drawn and thereby rotates thrust plate 10 in the direction indicated by arrow 10ᶜ, seen in Fig. 3. This rotation of said plate carries wedge blocks 10' against fixed wedge blocks 11' the inclined faces of which cause said plate 10 to slidably move on shaft 2. Said plate 10 moves bearing 15 which moves thrust collar 9 against spring tension disk 8, which by its elastic pressure moves the described clutch disks from the position seen in Fig. 1, toward the position seen in Fig. 7. The frictional contact of driving disks 6 causes drum disks 5 to thereby be slowly rotated, thereby slowly rotating the thereto attached parts, including drum 4 and the described driving means. Continued manual drawing of rod 10'' increases the elastic pressure of tension disk 8 on the described clutch disks thus increasing their friction, which increases the speed of rotation of disks 5 and the said driving means. This manual drawing of rod 10'' is thus continued until the parts have thereby been moved from the position seen in Fig. 1 to the position seen in Fig. 7, upon which said driving means will have attained the full speed of the rotation of shaft 2, without sudden strain on the parts involved. Reverse manual movement of rod 10'' causes a reverse rotation of plate 10, upon which the rotative movement of the described disks causes the parts of the clutch to move from the position seen in Fig. 7 to the position seen in Fig. 1, thereby releasing the described clutch engagement of said driving means from shaft 2. It will be understood that the friction of said disks generates warmth therein, which is transmitted therefrom to shaft 2. This warmth causes the described oil to flow, and the centrifugal force of said oil, (being rotated in said shaft,) causes said oil to flow through oil ducts 19, thus automatically lubricating all of the parts where lubrication is required. When it is desired to clean the described parts without disassembling the same, shaft 2 is emptied of said heavy oil, and a light oil, such as coal oil, or a spirit, such as gasolene, alcohol, or the like is poured into said shaft. Screw 18' is removed from oil outlet aperture 18, and the clutch is operated intermittently as described, until the liquid centrifugally thrown from aperture 18 is comparatively clean. Said cleaning liquid is then removed and a light lubricating oil is served in the same manner, after which shaft 2 is again filled with the previously mentioned heavy oil.

I have shown and described the tension disk 8 as seen in Figs. 1 and 5, but the same may be made of such other forms as various degrees of elasticity of said disk required for lighter or heavier work may demand; one of such other forms being shown in Fig. 6, in which disk $8^d$ has slots $8^e$ formed therethrough for giving more freedom of movement to the inner edge of said disk.

As seen in Fig. 1, I have shown and described clutch shaft 2 secured to rotating means 1, which latter is a portion of one certain form of motor cycles now in use. I reserve the right to so modify the inner end of clutch shaft 2 and the form of drum 4 and the driving means 3 that said parts shall be adapted to be used on motor cycles of other forms. One of such other forms of said parts is shown in Fig. 7, in which clutch shaft $2^c$ is secured on the outer end of an engine shaft $1^d$ by key $2^d$ and by cone nut $2^e$, the latter being screwed on the end of said engine shaft.

The V shaped friction face $2^f$ is formed with the inner end of clutch shaft $2^c$ while the opposing friction face $3^c$ is formed with belt pulley $3^a$. Clutch drum $4^a$ is formed in the outer half portion of said pulley.

All of the remaining parts are like the ones shown in Fig. 1, both in construction and operation and are therefore designated by the same numerals.

I am aware that multiple disk clutches are old and have been used in a variety of ways, and therefore do not broadly claim such.

What I claim as new and original and desire to secure by Letters Patent is:—

1. In a clutch in combination, a hollow clutch shaft adapted to receive lubricating oil therein, said shaft having oil ducts formed through the wall thereof; shaft rotating means; shaft securing means whereby said clutch shaft is secured to said rotating means and whereby the inner end of said shaft is closed; removable closing means in the outer end of said shaft for closing the same; a clutch drum loosely mounted on said shaft said drum having a closable oil outlet aperture formed therethrough and driving means connected therewith; a plurality of friction disks slidably mounted in said drum and adapted to engage said drum with said clutch shaft by frictional engagement of said disks; sliding means loosely mounted on said shaft for sliding said disks into frictional engagement, and retaining means on the outer end of said shaft whereby said drum, said disks and said sliding means are retained in place, the whole adapted to form automatic lubricating and flushing means for automatically lubricating the outer surface of said clutch shaft, the inner surface of said drum, said friction disks and said sliding means, and for flushing the same in order to clean said parts.

2. In a clutch, rotating means adapted to be rotated by power; a clutch shaft provided with securing means whereby one end of said shaft is secured to said rotating means; driving means adapted to transmit power from said clutch to another mechanism for driving the latter; a clutch drum, said driving means and drum being secured together and being rotatably mounted on said shaft; a V shaped friction face fixed with said shaft; another friction face formed on said driving means adapted to frictionally contact said V shaped face; a plurality of disks in said drum adapted to transmit power from said shaft to said drum by frictional contact of said disks; an elastic disk the outer edge of which is secured to the outer edge of the outer one of said disks; a thrust collar loosely mounted on said shaft and moving means mounted on said shaft whereby said collar is moved against the inner free edge portion of said elastic disk for moving said plurality of disks and said friction faces into frictional contact.

In testimony whereof I affix my signature in the presence of two witnesses.

JAMES B. HERNDON.

Witnesses:
 JOHN J. HINTON,
 ROBT. R. EDWARDS.